May 13, 1924.
K. F. SIMON
HINGE
Filed Dec. 16, 1921
1,494,139
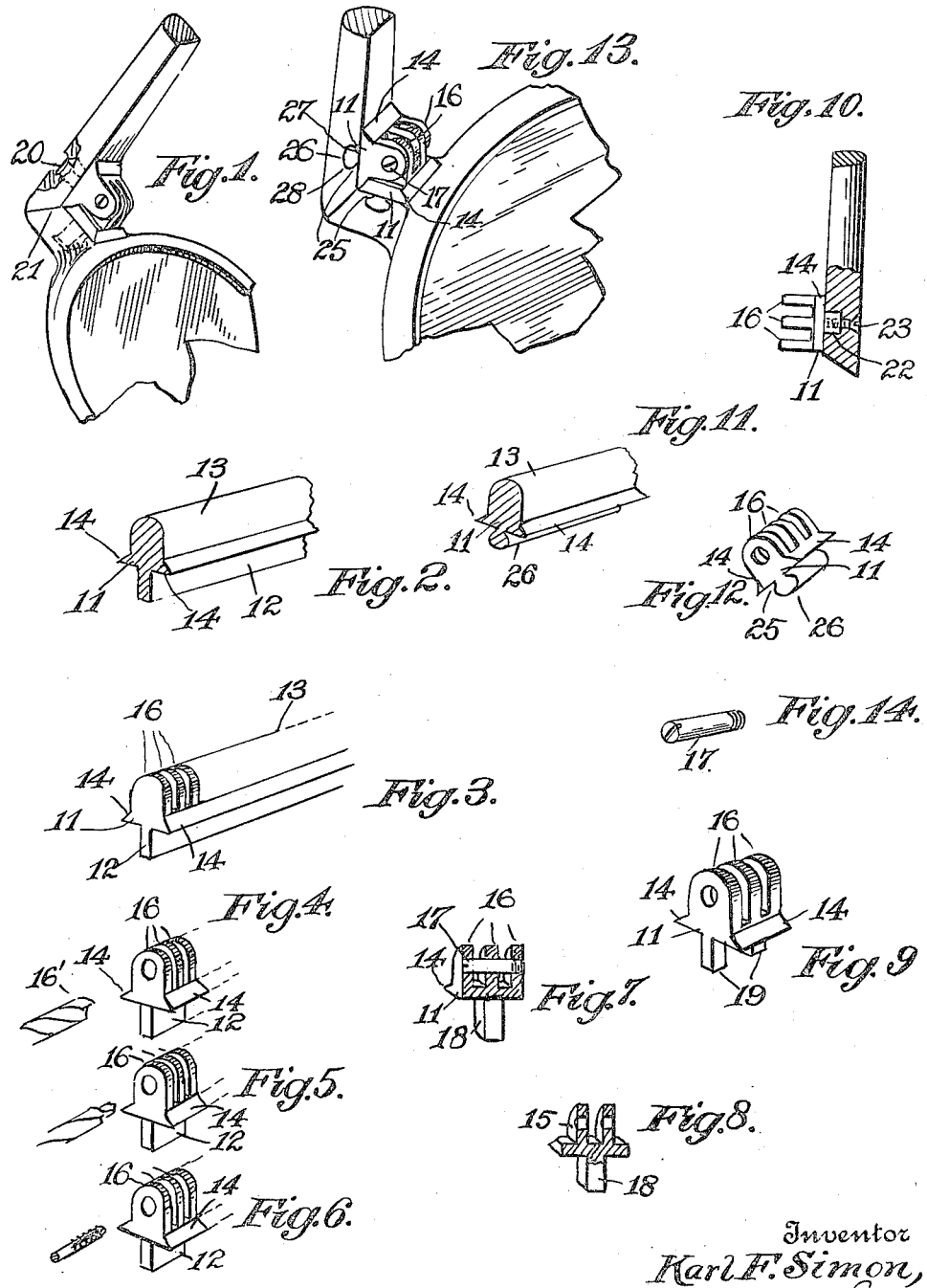

Patented May 13, 1924.

1,494,139

UNITED STATES PATENT OFFICE.

KARL F. SIMON, OF NEWARK, NEW JERSEY, ASSIGNOR TO CLARA W. SIMON, OF NEWARK, NEW JERSEY.

HINGE.

Application filed December 16, 1921. Serial No. 522,865.

*To all whom it may concern:*

Be it known that I, KARL F. SIMON, a subject of Germany, and a resident of Newark, in the county of Essex and State of New Jersey, have invented certain new and useful Improvements in Hinges, of which the following is a specification.

This invention relates to knuckle hinges adapted for use in hingedly connecting the bows and frames of spectacles made of celluloid or the like, and it is an object of the invention to improve the general construction and arrangement of such hinges whereby the connection of the bows with the rims may be brought more closely to the spectacle rim and practically conceal the hinge when the spectacles are in use.

It is a further object of the invention to construct and arrange the respective parts of the hinge with integral attachment means to co-operate with the material of the spectacle rim and bow in mounting the hinge thereon, and the hinge members arranged with abutments which are adapted to co-operate to limit the movement of the bow in one direction relative to the spectacle frame and take up any outward strains applied to the bows.

Another object of the invention relates to a method of making the hinge.

Other objects and advantages will hereinafter appear.

In the drawing accompanying and forming a part of this specification, Figure 1 is a perspective view of a portion of a spectacle rim and bow with my improved hinge applied thereto to hingedly connect the two.

Figure 2 is a perspective view of a portion of a stock bar from which the members of my improved hinge are made.

Figure 3 is a view in perspective of the bar shown in Fig. 2 showing the method of transversely slotting a portion of the bar and perforating the same to form the hinge knuckles and the attachment means to be successively formed and severed from the bar to constitute the hinge members.

Figures 4, 5 and 6 are perspective views of a portion of the stock bar to show the successive steps in the forming of the perforations in the hinge knuckles for the reception of the hinge pintle.

Figure 7 is a perspective view of a finished hinge member.

Figure 8 is a view of the complemental hinge member to co-operate with the hinge member shown in Figure 7.

Figure 9 is a side elevation of a hinge member showing a modified arrangement of the attachment means.

Figure 10 is a side elevation of a hinge member showing a further modified arrangement of attachment means and showing the same attached to a spectacle bow or rim.

Figure 11 is a perspective view of a modified form of stock bar from which to construct the hinge members.

Figure 12 is a perspective view of a hinge member made from the bar shown in Figure 11.

Figure 13 is a view similar to Figure 1 to show the manner of mounting the hinge constructed from the bar shown in Figure 11.

Figure 14 is a side elevation of a pintle used in the construction of the hinge.

Similar characters of reference designate like parts throughout the different views of the drawing.

In carrying out the invention as shown in Figures 1 to 9 of the drawing I provide a bar as shown in Figure 2, which is preferably drawn metal, having a base portion 11 with laterally extending ribs 12 and 13 arranged opposite to each other. The ribs are of less width than the base portion, with the rib 12 of less width than the rib 13 whereby the base or body portion extends beyond the opposite sides of the ribs and has the face of such extended portion beveled adjacent the rib 13, as shown at 14 to serve as an abutment for a purpose to be hereinafter set forth.

The hinge members are successively formed and severed from the bar, the first step being to transversely slot the rib 13, as by a milling cutter, to form hinge knuckles 16, the number of slots depending upon the number of knuckles and length of hinge desired, and the width of the slots and knuckles being equal. In the present instance the one hinge member as shown in Figures 4 to 6 consists of three knuckles and two intervening spaces the outer sides of the end knuckles constituting the extremities of the hinge. In this construction the complemental hinge member is arranged with two knuckles, as shown in Figure 8, to engage the spaces between the knuckles of the hinge member shown in Figures 4 to 6.

After the bar has been slotted as above described a countersink 16 (Figure 4) is arranged in the outer knuckle for the reception of the filister head of a screw 17 to constitute the hinge pintle as shown in Figure 14. The first and second knuckle are then perforated by drilling as shown in Figure 5, when the last knuckle is perforated by drilling but said perforation being of less diameter than the perforations in the first two knuckles as clearly shown in Figure 7 when the last perforation is threaded as by a tap as shown in Figure 6. While the perforating of the knuckles has been described as requiring two operations it will be obvious that the perforations as well as the countersink may be performed in one operation by a suitably constructed drill. In the complemental hinge member 15 the knuckles are only perforated to permit of the passage of the screw pintle.

After the knuckles have been formed the rib 12 is cut away as by a transverse mill to leave a portion 18 of rectangular shape in cross section projecting from the base or body portion opposite to the knuckles (Figure 7) to constitute a means or member for mounting and anchoring the respective members of the hinge upon the spectacle frame and bow as hereinafter set forth. Instead of providing the hinge members with a single attaching member 18 portions of the rib 12 may be cut away to provide a pair of projecting members as shown at 19 in Figure 9. The knuckles are preferably arranged or formed upon the bar first whereby the rib 12 serves as a strengthening member during the slotting of the bar to form the knuckles. To arrange the attachment member or members first on the bar would weaken the bar with the possibility of straining and rupturing the metal during the cutting of the knuckle slots. After the bar has been slotted as above described to produce a hinge member of the desired length the same is severed from the bar when the foregoing described operations are repeated to produce a successive hinge member. To assemble the hinge the hinge members are arranged with the knuckles of the member shown in Figure 8 engaging in the knuckle spaces of the hinge member shown in Figure 7 when the pintle screw is fitted into the knuckle perforations and the hinge is in condition to be mounted upon the spectacle rim and bow.

To mount the hinge the spectacle rim and bow is provided with a hole or holes of a diameter substantially of the cross sectional dimension of the attachment member or members 18, 19 and the attachment members are forced into such openings the corners of such members biting into the material of the rim and bow in embedding relation therewith to anchor the hinge members firmly therein. If desired the outer ends of the attachment members are upset as shown at 20 in Figure 1. The end of the bow is beveled and the end of the projecting portion of the rim usually provided for the mounting of the hinge is also beveled to correspond to the end of the bow thereby forming a miter joint, as shown at 21, to limit the outward movement of the bow, and to relieve the bow and rim of any strain which may be exerted upon the same the hinge members are arranged with the beveled portions 14 to extend the full length of the hinge members forming abutting faces when the hinge is mounted upon the rim and bow as clearly shown in Figure 1. To facilitate the mounting of the hinges the bevel portion 14 is arranged at opposite sides of the knuckles. By the construction of hinge described a hinge of minimum width may be produced whereby the one hinge member may be mounted practically upon the spectacle rim with the bows brought up closely to the rim thereby enhancing the appearance of the spectacles and the bows to lie close to the temple bone.

In the construction of hinge shown in Figure 10 the hinge attachment members 18, 19 are of slightly less length than the thickness of the bow or rim and arranged with a threaded bore 22 in the ends thereof, and instead of upsetting the end of said attachment members to prevent longitudinal displacement thereof a headed screw 23 is threaded into the bore of such members, as shown in Figure 10.

In Figure 12 I have shown a further modified form of attachment member to anchor the hinge members in the material of the bows and frame, the hinge being constructed from a bar as shown in Figure 11. This stock bar is arranged with the base or body portion and oppositely extending ribs similar to that shown in Figure 2, with the exception that the rib 12 is of circular shape in cross section with the width of said rib at the juncture thereof with the base portion of less width than the diameter of the rib, as shown at 25. The hinge knuckles are provided successively in the same manner as hereinbefore described and after the knuckles have been formed the hinge member is severed from the bar with the rib 12 extending the full length of the hinge member to constitute the attachment member. To mount this form of hinge a hole is suitably arranged in the material of the rim and the bow as by drilling into the material and cutting through the hole of said wall to provide a slot of less width than the diameter of the hole for the engagement and wedging or anchoring the attachment member 26 in the material of the rim and bow in embedded relation thereto, as shown at 27 in Figure 13. In mounting the hinge the hinge portion 26 is inserted in a longitudinal direction into said opening with the material of the bow and rim engaging and clamped in the spaces formed between the shoulder between the extended portions of the base and the attachment member of greatest width, as at 28, thereby preventing the detachment of the hinge members by a lateral strain. To prevent accidental displacement of the hinge relative to the bow and spectable rim the opposite ends of the attachment member may be slightly upset.

Having thus described my invention, I claim:

1. In a knuckle hinge, a pair of one piece hinge members, each member comprising a base portion transversely slotted at one side to provide the base with integral laterally extending knuckles and arranged with attachment means at the side of the base opposite to the knuckles and of less cross sectional dimension than the base for imbedment in the material of its support, and the knuckles perforated for the engagement of a pintle.

2. In a knuckle hinge, a pair of one piece hinge members, each hinge member comprising a base portion transversely slotted at one side to provide the base with integral laterally extending perforate knuckles and arranged at the side opposite to the knuckles as attachment means, the said base intermediate the knuckles and attachment means being of greater width than the knuckles and attachment means and beveled at the side at which the knuckles are arranged for the purpose specified.

3. In a knuckle hinge, a pair of hinge members, each hinge member comprising a base portion transversely slotted at one side to provide the base with knuckles extending laterally thereof and attachment means extending from the base opposite to the knuckles for imbedment in the material of its support to mount the hinge member, said attachment means being of less width than the base to provide a shoulder at the juncture thereof with the base for the purpose specified.

4. In a knuckle hinge, a pair of one piece hinge members, each hinge member comprising a base portion having knuckles extending laterally thereof and an attachment member extending opposite to the knuckles, said base portion being of greater width than the attachment member to form a shoulder at the juncture of the attachment member with the base and the knuckles of the members adapted to inter-engage and arranged with perforations for the engagement of a pintle.

5. A knuckle hinge member, comprising a base having knuckles extending laterally thereof and an attachment member opposite to the knuckles, said base being of greater width than the knuckles and attachment member with the edges of the extended base portion at the knuckle side beveled, and the attachment member being of less width than said base, for the purpose specified.

6. As an article of manufacture, a stock bar for the manufacture of one piece knuckle hinge members, comprising a base portion arranged with opposite longitudinally extending ribs, with one rib being of less width than the base portion.

Signed at New York city, in the county of New York and State of New York, December, 1921.

KARL F. SIMON.